United States Patent
Breuer et al.

(10) Patent No.: US 9,515,768 B2
(45) Date of Patent: Dec. 6, 2016

(54) METHOD OF DETECTING A JAMMING TRANSMITTER AFFECTING A COMMUNICATION USER EQUIPMENT, DEVICE AND USER EQUIPMENT AND SYSTEM WITH THE USER EQUIPMENT

(71) Applicant: GEMALTO M2M GMBH, München (DE)

(72) Inventors: Volker Breuer, Bötzow (DE); Bernd Röhl, Berlin (DE)

(73) Assignee: GEMALTO M2M GMBH, Munich (DE)

( * ) Notice: Subject to any disclaimer, the term of this patent is extended or adjusted under 35 U.S.C. 154(b) by 6 days.

(21) Appl. No.: 14/401,238

(22) PCT Filed: May 6, 2013

(86) PCT No.: PCT/EP2013/059373
§ 371 (c)(1),
(2) Date: Nov. 14, 2014

(87) PCT Pub. No.: WO2013/171085
PCT Pub. Date: Nov. 21, 2013

(65) Prior Publication Data
US 2015/0126181 A1    May 7, 2015

(30) Foreign Application Priority Data
May 14, 2012   (EP) .................................... 12167935

(51) Int. Cl.
*H04K 3/00*    (2006.01)
*H04B 1/707*    (2011.01)
(Continued)

(52) U.S. Cl.
CPC ................ *H04K 3/22* (2013.01); *H04B 1/707* (2013.01); *H04K 3/222* (2013.01); *H04W 24/08* (2013.01); *H04K 2203/16* (2013.01)

(58) Field of Classification Search
CPC ..... H04W 24/08; H04W 4/005; H04W 4/08; H04W 74/006; H04W 74/0833; H04B 1/707; H04K 3/22; H04K 2203/16; H04K 3/222
USPC ............. 455/522, 67.11, 13.4, 423; 370/229, 370/230, 350, 503, 328, 329
See application file for complete search history.

(56) References Cited

U.S. PATENT DOCUMENTS

2008/0123585 A1* 5/2008 Granzow ............ H04W 72/044
                                                                370/320
2008/0267165 A1* 10/2008 Bertrand ................... H04J 3/06
                                                                370/350

(Continued)

FOREIGN PATENT DOCUMENTS

FR          2 918 828 A1    1/2009
JP          5-284100 A      10/1993

(Continued)

OTHER PUBLICATIONS

International Search Report (PCT/ISA/210) mailed on Jun. 6, 2013, by the European Patent Office as the International Searching Authority for International Application No. PCT/EP2013/059373.

(Continued)

*Primary Examiner* — Inder Mehra
(74) *Attorney, Agent, or Firm* — Buchanan Ingersoll & Rooney PC

(57) ABSTRACT

Method of detecting a jamming transmitter, affecting a communication user equipment, wherein said communication user equipment is adapted for communication with a component of a cellular code division multiple access based radio network having a number of user equipments and a number of base node stations, providing the user equipment in a connected mode of a communication radiolink with the component of the radio network wherein in the connected mode of said user equipment jamming detection steps are provided.

16 Claims, 9 Drawing Sheets

(51) Int. Cl.
*H04W 24/08* (2009.01)
*H04J 13/00* (2011.01)
*H04W 56/00* (2009.01)

(56) References Cited

U.S. PATENT DOCUMENTS

| | | | |
|---|---|---|---|
| 2011/0151795 A1* | 6/2011 | D'Avello | H04K 3/226 455/63.3 |
| 2011/0170420 A1* | 7/2011 | Xi | H04L 5/001 370/241 |
| 2011/0223851 A1* | 9/2011 | Stoddard | H04K 3/28 455/1 |
| 2012/0170754 A1 | 7/2012 | Girard et al. | |
| 2012/0327801 A1* | 12/2012 | Seo | H04B 1/74 370/252 |
| 2013/0034092 A1* | 2/2013 | Lampinen | H04W 56/003 370/350 |
| 2015/0030033 A1* | 1/2015 | Vasseur | H04W 40/22 370/400 |

FOREIGN PATENT DOCUMENTS

| | | |
|---|---|---|
| WO | WO 00/62437 A1 | 10/2000 |
| WO | WO 2005/112321 A1 | 11/2005 |
| WO | WO 2007/019814 A1 | 2/2007 |

OTHER PUBLICATIONS

Written Opinion (PCT/ISA/237) mailed on Jun. 6, 2013, by the European Patent Office as the International Searching Authority for International Application No. PCT/EP2013/059373.

* cited by examiner

FIG. 2
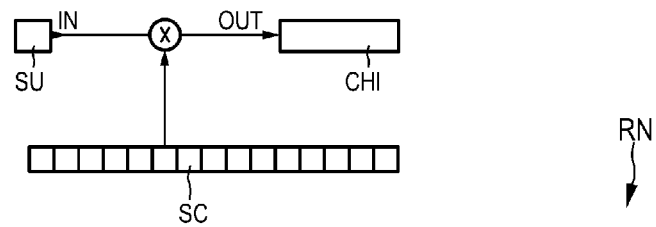
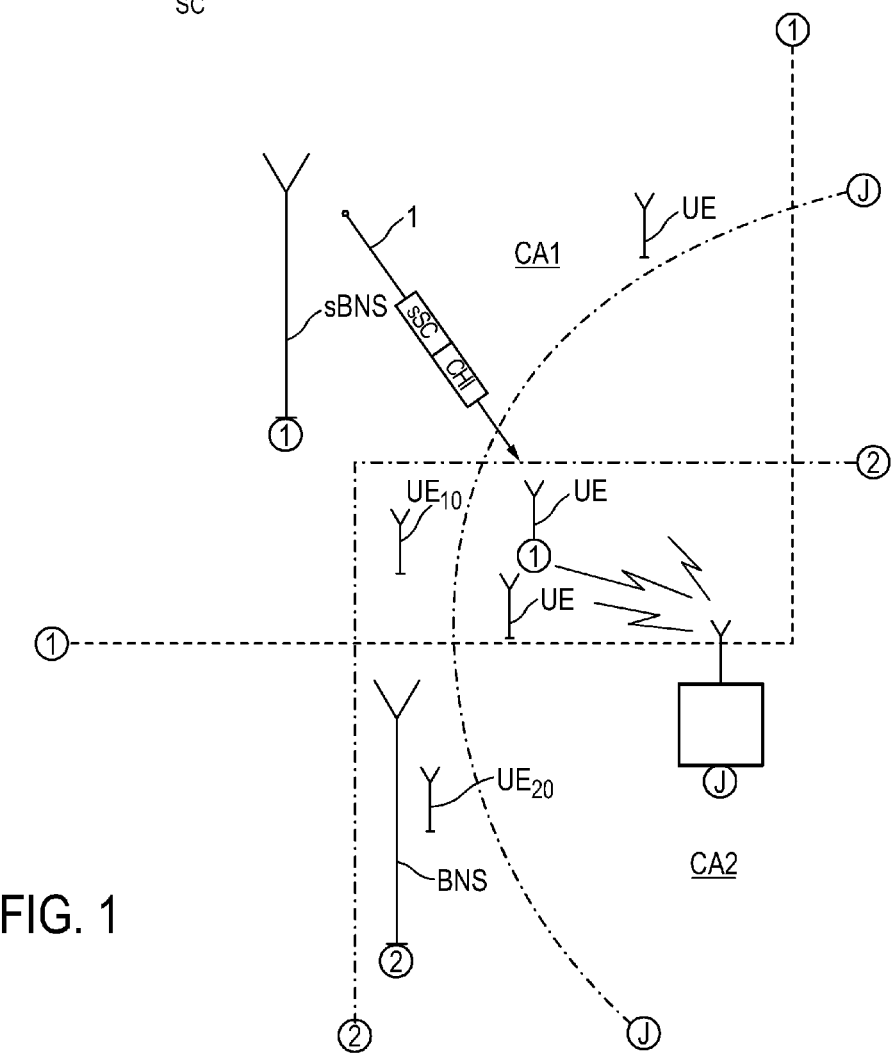
FIG. 1

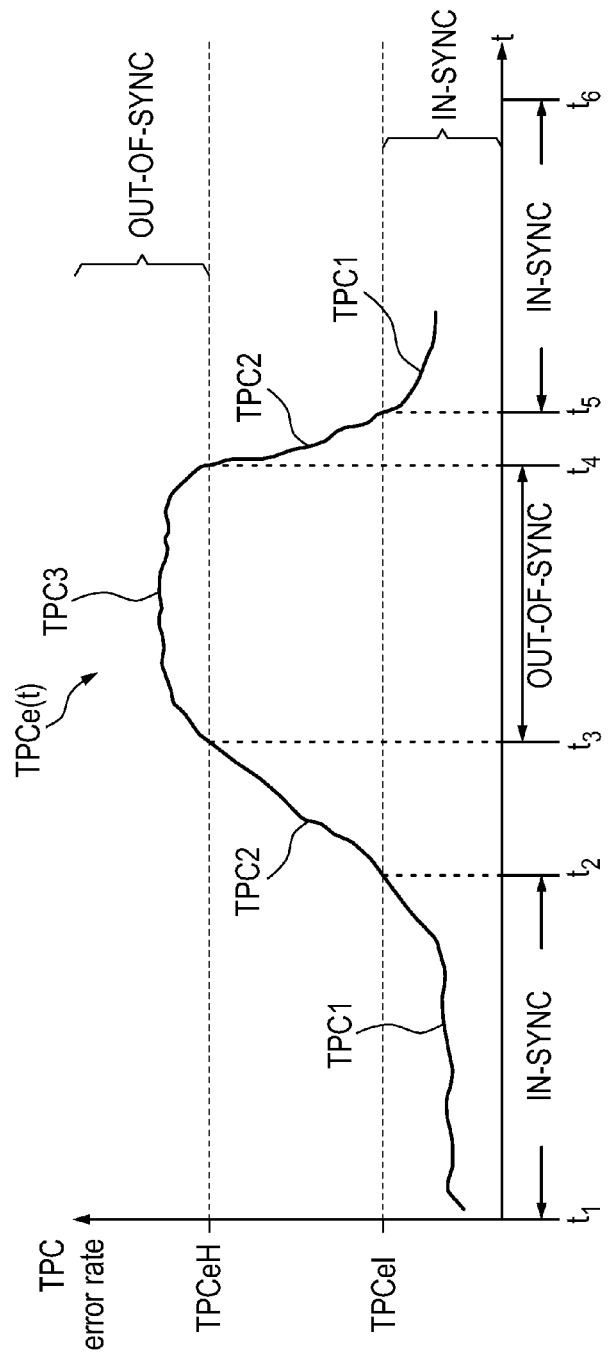

METHOD OF DETECTING A JAMMING TRANSMITTER AFFECTING A COMMUNICATION USER EQUIPMENT, DEVICE AND USER EQUIPMENT AND SYSTEM WITH THE USER EQUIPMENT

The present invention relates to a method of detecting a jamming transmitter affecting a communication user equipment according to the preamble part of claim 1. The present invention also relates to a device configured to execute said method and a system of the device with the user equipment with interfaces to the user equipment and with an application configured to execute said method.

Contemporary cellular radio networks known since many years are now meanwhile based on different technologies. The broadest coverage still is held by the global system for mobile communications according to the so-called GSM standard. A user equipment in such cellular network can move freely and may be handed over to various cells of the GSM networks as for instance described in GSM standard specification 3GPP ETSI TS 51.010 or the like.

Contemporary radio networks are based on a cellular code division multiple access CDMA as for instance realized in the universal mobile telecommunication system UMTS. Networks implementing these standards are increasingly important for security applications like camera systems or the like.

Generally, a user equipment in radio networks can be subject of being affected by a jamming transmitter—jamming in this context generally is performed by an instrument preventing a user equipment from receiving signals from its base station. In use the jammer effectively disables cellular phones mostly by broad frequency interference with communication frequencies of the user equipment at high power level. Whereas some jammer applications are meant to be legal for instances in places where phone call is to be suppressed due to silence conditions. Other jammers are applied during misuse for instances to interrupt security applications of user equipment or the like. Jammers are available for jamming GSM and also UMTS frequencies. However, jamming detecting and preventing solutions are known up to date basically only against GSM jammers. In this regard, it should be recognized that primary aim of an anti-jamming solution is to undoubtedly detect a jamming attack; however, it is also desirable to prevent the same.

In WO2005/112321 a method for jamming detection in a GSM mobile telecommunications network is described comprising the steps of, at a user equipment registered with the mobile telecommunications network: a) measuring a signal power level in at least one of a plurality of communication channels between the user equipment and a base station within a band of operation of the mobile telecommunications network; b) checking whether the signal power level in said at least one communication channel is greater than a threshold MNPL and, if so, attempting to decode a Base Station Identity Code BSIC broadcast by the base station in said communication channel; c) repeating steps a) and b) for a certain number of channels; d) signaling a jammed condition report JDR message to the base station if said BSIC cannot be decoded for said number DCMN of channels. This method suffers from the fact that usually a signaling of a jammed condition report JDR message to the base station is not possible due to the jammed condition; thus the jammed condition remains unanswered.

An anti-jamming solution is known from WO 2007/019814 which however also is restricted to the GSM standard. Therein a method for detecting a jamming transmitter affecting a communication terminal is described wherein receipt radio channel signal levels are evaluated at periodic intervals on a signaling channel. In the case that the communication terminal detects a radio channel signal level that exceeds a predefined threshold value in the signaling channel but is nevertheless unable to decode a message content of a message, then this state is interpreted as an interference state and an alarm signal is emitted. The problem related with this GSM anti-jamming solution is its fundament on a predefined threshold value in the signaling channel and the receipt of a message content. These features are somewhat specific for the GSM technology, however, less suited in the UMTS technology. More specifically it turns out that an anti jamming solution in the frame of a cellular code division multiple access based radio network is much more demanding. The state of dealing with disturbances in a communication frequency band of a user equipment is more or less a usual state of operation for a user equipment within a cellular code division multiple access based radio network. In particular, intracell and intercell interferences are generally accepted in a CDMA based radio network as long as a signal can be decoded. Thus, the state of operation naturally is permanently disturbed due to the CDMA based technology.

The specific reason is as follows. A communication user equipment UE and a number of base node stations BNS are the basic components of a CDMA based radio network. The radio network RN may work in either a frequency division duplex FDD or also a time division duplex TDD mode. Once a communication link in a serving cell coverage area is provided between the communication user equipment and a serving base node station sBNS a communication signal unit SU is correlated with a pseudonoise spread code SC in a serving cell coverage area CA of a serving base node station and transmitted as a pseudonoise chip CHI in a multiple shared communication frequency channel. Thus, interferences of multiple base node stations and user equipments in the communication frequency channel are spectrally located between an upper frequency and a lower frequency of a communication frequency band. Consequently, a broad band "jamming like" interference in the multiple shared communication frequency channel can not be considered as an extraordinary event but is on the contrary part of the usual state of operation. Such situation may also occur each time the number of users changes in said frequency band. The similar situation may also occur when a user equipment has a comparatively large or a comparatively small distance to a base node station. Also a similar situation may occur when a user equipment is in the reach of two base node stations in particular vice versa when two user equipments belong to the same or neighboring cells of the CDMA based radio network. In conclusion, an anti-jamming solution to be successfully implemented in a CDMA based radio network technology is more sophisticating.

In WO 00/62437 a concept for improving jammer detection sensitivity in a CDMA based communication network is provided wherein spectral analysis data are used to identify jamming signals having power spectral density characteristics which are distinguishable from those of legitimate subscriber transmissions in the wireless system's frequency band. By using several base stations located near the jamming transmitter, and by comparing the power spectral densities received at those base stations, the location of the jamming transmitter is estimated. Additionally, such spectral analysis data is used to detect aberrant receive spectrum characteristics which may indicate a hardware malfunction or failure. The spectral analysis uses a model of a real-inputdata FFT and complex-input-data FFT for a CDMA signal bandwidth C of approximately 1.25 MHz and is based on the assumption that a jammer detection threshold will be set relative to a "noise floor", and it can be concluded that the jammer detection threshold will be the same for the two cases of a FFT. The (in-band) power spectral density P will be the same for either technique, with the power spectral density equaling P/C. But because the jammer power divided equally between a I and a Q branch, the jammer power will be 3 dB less for the real-input-data FFT than in the case of the complex-input-data FFT.

Nevertheless, generally and as compared to the above mentioned GSM solution of WO 2007/019814 and WO2005/112321 a predefined threshold value for a signal level of a specific signalizing channel for a user equipment per se cannot be defined. Either the channel and/or the signal level is continuously changing depending on the surroundings of the network. Also, a message content as such can not be received unless a pseudonoise spread code is received by the communication user equipment. Consequently, without pseudonoise spread code neither transmission nor a content of a message is possible unless the pseudonoise spread code is known to the user equipment.

In 3GPP TS 25.133 in Chapter 422.1 a measurement and evaluation of cell selection criteria S of a serving cell is described, wherein the user equipment shall measure the CPICH Ec/Io and CPICH RSCP level of the serving cell and evaluate the cell selection criterion S defined in 3GPP TS 25.304 ("UE Procedures in Idle Mode and Procedures for Cell Reselection in Connected Mode"). After a certain period a user equipment is considered to be "out of service area" and shall perform actions according to 3GPP TS 25.331 ("RRC Protocol Specification"). On transition of the user equipment to another cell and if a user equipment cannot find a suitable UTRA cell, then it is considered to be "out of service area" and shall perform actions according to 3GPP TS 25.331. Thus, in principle, if no suitable cell according to its power level is found, the user equipment shall be considered to be out of service. This procedure demands for measuring one or more power levels.

Although a jamming-detection concept can be advantageously also be based identifying contents of messages or on measuring power levels, primarily it is desirable to have an anti-jamming concept which is less dependent on sophisticated measurement of signal strength or power and thus is more reliable. In particular in a CDMA based radio network decoding and dispreading procedures have to be taken into account when a comparison of power levels is taken as a basis for a jamming-detection and could be avoided. Also, all the above mentioned approaches suffer from the fact that a jamming situation can only be detected rather than prevented. However, jamming preventing solutions are highly desirable for UMTS standards. In this regard, it should be recognized that primary aim of an anti-jamming solution is to undoubtedly detect a jamming attack but nevertheless preventing the same shall be possible as well. At least a rather early detection of a jamming attack can help to prevent the same.

Usually, jamming results first in a user equipment losing traffic connection to the base station; thus user equipment falls back to idle mode. Thus, the mobile station is not able to make or receive a call. The above jamming approaches have the aim to detect a jamming situation only in the idle mode before the user equipment is unable to continue camping on the cell. It is known for instance that the idle mode still preserves certain operations as the user equipment is still registered in the radio network, that is when the user equipment (also referred to as a mobile station MS) is switched on but has no dedicated physical channel allocated. In particular certain idle mode tasks are still possible to provide a radio subsystem link control. As outlined above, a jamming detection in the idle mode is rather late and thus limits the chances to prevent a jamming situation.

This is where the invention comes in, the object of which is to provide an improved method of detecting a jamming transmitter affecting a communication user equipment wherein the communication user equipment and a number of base node stations are adapted to be components of a cellular code division multiple access based radio network like for instance frequency division duplex or time division duplex mode radio network. In particular it is an object of the invention to provide a method of detecting a jamming transmitter rather early, in particular prior that the user equipment falls back into the idle mode. A further object of the invention is to provide an improved communication module, in particular user equipment, adapted to execute the method of detecting a jamming transmitter affecting the communication user equipment, in particular to detect the jamming situation already whilst the communication user equipment is in a connected mode, in particular if the user equipment has a dedicated physical channel allocated; preferably before the connection breaks down. In particular the method and the communication module shall be adapted to detect a jamming warning before a jammed situation is to be accepted; in particular it shall be discriminated between an out of service state of the user equipment and a jamming warning situation. It is still another object of the invention to provide such method and device with a more elaborated anti-jamming concept allowing also detection of a jamming transmitter on a broad frequency range. In particular it is an object of the invention to provide an effective and reliable method and device for detecting a jamming transmitter affecting a communication user equipment and while nevertheless being less dependent on sophisticated measurement of signal strength or power.

As regards the method, the object is achieved by the invention with a method as claimed in claim 1.

As regards the device, the object is achieved by the invention with a device for a user equipment as claimed in claim 15.

As regards the device, the object is achieved by the invention with a system as claimed in claim 16.

Therein a communication user equipment UE is adapted for communication with a component of a cellular radio network RN having a number of user equipments UE and a number of base node stations BNS. Preferably the cellular radio network RN provides a synchronization channel SCH for synchronization of the user equipment UE to a cell of the cellular radio network RN, and wherein the detection device is provided in the neighborhood or part of the user equipment. Said communication user equipment UE and a number of base node stations BNS are components of a cellular code division multiple access CDMA based radio network RN, in particular in a frequency division duplex FDD or time division duplex TDD mode. Preferably a pseudonoise spread code SC is for spreading a communication signal unit SU and a synchronization of the user equipment UE to a cell of the cellular radio network RN is determined during a cell search from a synchronization channel.

The instant concept of jamming detection and/or warning according to the invention is based on providing the user equipment UE in a connected mode of a communication radiolink with the component of the radio network RN.

According to the invention in the connected mode of said user equipment UE the steps are provided:
- generating a synchronization-indication wherein the synchronization-indication is generated from power control of the dedicated physical channel (DPCH)
- evaluating the synchronization-indication,
- measuring a further parameter at the dedicated physical channel (DPCH), in particular a Layer-1 parameter associated with the dedicated physical channel (DPCH),
- indicating a jamming situation in dependence of the evaluation.

The cellular radio network RN provides a dedicated channel DPCH for a communication radiolink of the user equipment UE to a cell of the cellular radio network RN and the user equipment UE is in a connected mode of a communication radiolink via the dedicated channel DCH. The synchronization-indication is generated from power monitoring of the dedicated physical channel (DPCH). Advantageously the dedicated physical channel DPCH is a dedicated physical data channel DPDCH and/or dedicated physical control channel DPCCH.

Preferably said communication user equipment (UE) and a number of base node stations (BNS) are components of a cellular code division multiple access (CDMA) based radio network (RN), in particular in a frequency division duplex (FDD) or time division duplex (TDD) mode, wherein a pseudonoise spread code (SC) is for spreading a communication signal unit (SU) and a synchronization of the user equipment (UE) to a cell of the cellular radio network (RN) is determined during connected mode of a communication radiolink via the dedicated channel (DPCH), adapted to indicate, in particular to an application layer, that a jamming transmitter is affecting the communication user equipment.

The method and developed configurations thereof as outlined above may be implemented by digital circuits of any preferred kind, whereby the advantages associated with the digital circuits may be obtained. In particular one or more method steps or features of the method can be implemented by one or more means for functionally executing the method step. A single processor or other unit may fulfill the functions of several means recited in the claims—this in particular holds for a user equipment according to the concept of the invention. The concept also leads to a computer program product storable on a storage device and adapted for executing the method when executed on a device.

The invention starts from the consideration that the user equipment per se and without further measures cannot distinguish between a normal mode frequency disturbance due to interferences originating from the CDMA system as outlined in the introduction on the one hand and a loss of service availability due to external disturbing factors which in the specific situation usually cannot be fixed. Basically for detecting a jamming transmitter affecting a communication user equipment and while nevertheless being less dependent on sophisticated measurement or comparison of signal strength or power the invention provides an alternative concept for nevertheless actively and reliably detecting a jamming situation.

Further the invention starts from the consideration that instant approaches for detecting a jamming situation are based on measurements at a mobile station (user equipment UE) in the idle mode. The instant invention recognized that nevertheless it is also possible to find sufficient indication for a jamming situation when the user equipment is in a connected mode of a communication radiolink to a component of the radio network; thus in particular wherein during the connected mode the user equipment has a dedicated physical channel allocated. So to say, in particular the concept starts from the recognition that a jamming detection preferably is possible in a status where the mobile station has a dedicated physical channel allocated; thus is able to make or receive a call. Advantageously this approach allows for detecting a jamming attack even during a call or connection, i. e. an in-call/connection jamming detection concept is provided.

Consequently, the method is characterized by providing the user equipment in a connected mode of a communication radiolink to a component of the radio network. More precisely, the method provides a basis to observe the impact of the jammer, respectively jamming power, on an existing radiolink. Preferably the user-equipment indeed can be in an active-status, i.e. is switched on. Consequently, the method preferably further is characterized by providing the user equipment in an active-status, respectively switched on.

The concept of the invention thus has an advantage overcoming solutions wherein a jamming detection is possible only in the idle mode or even only in the out of service mode. Instantly, the concept provides a method for detecting a jamming situation in-call/connection, that is to say, already when a dedicated physical channel is allocated for the mobile station a jamming situation or an approach of a jamming situation can be detected. This has the advantage that a camera or other security systems can provide a better performance. An anti-jamming detection is rather quick and countermeasures can be provided in a broader and earlier range.

For instance according to a known approach, a jamming detection is based on detecting that no cell can be received (BCCH) although a high RSSI level is measured. But in a jamming situation a mobile station will at first lose the connected mode of a communication radiolink and will than fall back into the idle mode. Subsequently, the mobile station will have to provide a band or channel search and only in the case this search is not successful a jamming situation can be assumed. In this stadium the mobile station might already be in the out of service situation. This is disadvantageous as it takes time to identify a jamming situation. However time is a valuable parameter in security applications like camera systems or the like.

By generating a synchronization indication—in particular generating an out of synchronization (OUT-OF-SYNC) or in synchronization (IN-SYNC) status—from power monitoring—in the connected mode, i. e. an in-call connection, in the dedicated physical channel—and evaluating the synchronization indication, the concept of the invention is able to Indicate a jamming situation already when the user equipment still is functioning in a connected mode, although the radiolink in the connected mode is already endangered.

The concept provides also for measuring a further parameter at the dedicated physical channel (DPCH), namely a Layer-1 parameter. Preferably a Layer-1 parameter is any parameter, which is measurable directly at the dedicated physical channel (DPCH).

Preferred examples of a Layer-1 parameter are a value of a received signal code power (RSCP) value or a value of average energy per pseudonoise chip (PN) in the DPCH or a total transmit power spectral density. In particular preferred is a value of the ratio Ec/Io of the average transmit energy per PN chip for different fields or physical channels, in particular the DPCH, to the total transmit power spectral density. If one of these or other comparable Layer-1 parameters indicate a high energy in the DPCH in combination with a lasting situation of IN-SYNC status than a very reliable indication of a jamming detection can be given.

Also, alternatively or a value of a check sum, e.g. a hash value or the like control value transmitted with the data or provided for control or check of the transmission can be used. Once the transmitted control value—in particular the checksum—is correct this is an indication of a correct transmission; however a deviation indicates a disturbed transmission. Thus a deviating control value can be used as a further parameter at the dedicated channel in the Layer-1 to indicate a jamming situation.

The concept of the invention also leads to a device for a user equipment, in particular a device reportingly connectable to an application layer, in particular configured to execute the method of detecting a jamming transmitter. According to the Invention the device is adapted to detect a jamming transmitter affecting the communication user equipment in a connected mode wherein the cellular radio network (RN) provides a dedicated channel (DPCH) for a communication radiolink of the user equipment (UE) to a cell of the cellular radio network (RN) and the user equipment (UE) is connectable in a connected mode of a communication radiolink via the dedicated channel (DPCH), wherein the detection device has
- a generation unit adapted for generating a synchronization-indication from a power monitoring of the dedicated physical channel (DPCH)—in particular comprising a power monitor detection unit preferably for a dedicated physical channel—,
- an evaluation unit adapted for evaluating the synchronization-indication—in particular for evaluating an in-synchronization state and an out-of-synchronization state—,
- a measuring unit adapted for measuring a further parameter at the dedicated physical channel (DPCH), in particular a Layer-1 parameter associated with the dedicated physical channel (DPCH), in particular only a Layer-1 parameter associated with the dedicated physical channel (DPCH),
- a detection unit adapted for detecting a jamming situation in dependence of output of the evaluation unit—in particular for detecting also in dependence of a number of further parameters.

The concept of the invention also leads to system of the device and a communication user equipment (UE) adapted for communication with a component of a cellular code division multiple access (CDMA) based radio network (RN) having a number of user equipments (UE) and a number of base node stations (BNS), wherein the cellular radio network (RN) provides a dedicated channel (DPCH) for a communication radiolink of the user equipment (UE) to a cell of the cellular radio network (RN) and the user equipment (UE) is connectable in a connected mode of a communication radiolink via the dedicated channel (DPCH), wherein the synchronization-indication is generated from power monitoring of the dedicated physical channel (DPCH), preferably wherein the detection device is provided in the neighborhood or as part of the user equipment.

These aspects of the invention and further developments thereof are further outlined in the dependent claims. Thereby the mentioned advantages of the proposed concept are even more improved.

Generally existing synchronization primitives as described in TS 25.214 can be used to derive the synchronization-indication, in particular IN-SYNC and/or OUT-OF-SYNC.

Most preferably the synchronization-indication is generated by means of a transmission power control (TPC). Transmission power control (TPC) is defined in the standard 3GPP TS 25.101. The power control step is the change in the UE transmitter output power in response to a single TPC command, TPC_cmd, derived at the UE. The UE transmitter shall have the capability of changing the output power in each assigned carrier. Per TPC_cmd a certain transmitter power control range is defined as outlined in 6.42.1 of 3GPP TS 25.101. TPC can be set for uplink, downlink, minimum, maximum power in open-loop or closed-loop condition. A transmission power control error is already defined in the standard and thus can be used advantageously for jamming detection. Preferably a rate of transmission power control errors can be used. E.g. the synchronization-indication is generated in a cycle to provide a rate of synchronization-indication, in particular wherein a cycle has a periodicity, in particular in a periodicity on a millisecond (ms) timescale.

Out-of-synchronization handling of output power as described in 6.4.4 of 3GPP TS 25.101 comprises the receiver characteristics in as specified at the antenna connector of the UE. For UE(s) with an integral antenna only, a reference antenna with a gain of 0 dBi is assumed. UE with an integral antenna may be taken into account by converting these power levels into field strength requirements, assuming a 0 dBi gain antenna. For UEs with more than one receiver antenna connector the AWGN signals applied to each receiver antenna connector shall be uncorrelated. The levels of the test signal applied to each of the antenna connectors shall be as defined in section 6.4.4.2 of 3GPP TS 25.101. The UE shall monitor the DPCCH quality in order to detect a loss of the signal on Layer 1, as specified in 3GPP TS 25.214. The thresholds $Q_{out}$ and $Q_{in}$ specify at what DPCCH quality levels the UE shall shut its power off and when it shall turn its power on respectively. The thresholds are not defined explicitly, but are defined by the conditions under which the UE shall shut its transmitter off and turn it on. The DPCCH quality shall be monitored in the UE and compared to the thresholds $Q_{out}$ and $Q_{in}$ for the purpose of monitoring synchronization. The threshold $Q_{out}$ should correspond to a level of DPCCH quality where no reliable detection of the TPC commands transmitted on the downlink DPCCH can be made. This can be at a TPC command error ratio level of e.g. 30%. The threshold $Q_{in}$ should correspond to a level of DPCCH quality where detection of the TPC commands transmitted on the downlink DPCCH is significantly more reliable than at $Q_{out}$. This can be at a TPC command error ratio level of e.g. 20%.

In a preferred embodiment the synchronization-indication is evaluated to a binary set of an in-synchronization state and an out-of-synchronization state. In particular then an out-of-synchronization state is used as a parameter to detect a jamming situation and/or an in-synchronization state is used as a parameter to detect a free-of-jamming situation.

Thus, particular preferred the jamming situation is detected only in dependence of a number of Layer-1 parameters. In particular only a Layer-1 parameter is selected from the group consisting of: one or more link power signals, one or more link quality signals, in particular an active set RSSI and/or a Ec/Io-signal, in-synchronization state, out-of-synchronization state.

Alternatively or additionally even more advantageous the synchronization-indication, i.e. most preferably a power monitor of the dedicated physical channel, is evaluated as function of time and/or amplitude, in particular according to one or more derivation of the function of time. Thus, the jamming situation is detected in dependence of a Layer-1 parameter and a Layer-2 parameter.

Thus, alternatively or additionally the synchronization-indication is evaluated as function of time and/or amplitude, in particular according to one or more derivation of the function. More precisely the synchronization-indication is evaluated by means of at least one amplitude measure for evaluating the amplitude behavior of the synchronization-indication, in particular wherein the amplitude of an out-of-synchronization state is evaluated to detect a jamming situation and/or the amplitude of an in-synchronization state is evaluated to detect a free-of-jamming situation. Alternatively or additionally more precisely the synchronization-indication is evaluated by means of at least one time measure for evaluating the time behavior of the synchronization-indication, in particular wherein the time span of an out-of-synchronization state is evaluated to detect a jamming situation and/or the time span of an in-synchronization state is evaluated to detect a free-of-jamming situation.

In particular the jamming situation is detected also in dependence of a number of further parameters—in particular a Layer-1 parameter and/or Layer-2 parameter and/or application layer parameter—wherein the further parameters are selected from the group consisting of: one or more good-reference parameters, one or more timers and/or counters, one or more cycles, in particular a periodicity.

Preferably the synchronization-indication is further evaluated by means of at least one time measure and the time measure has one or more start-triggers and/or stop-triggers and/or one or more timer- and/or counter-means. This can be used to increase reliability of a jamming detection and/or warning. More specifically preferred is a first timer- and/or counter-means starting from a begin-time (t3) of an OUT-OF-SYNC state, in particular for indicating a OUT-OF-SYNC error after expiration. Even more specifically preferred is a second timer- and/or counter-means starts from a time (t4) of an OUT-OF-SYNC state after a first timer- and/or counter-means, in particular for indicating a RADIO LINK failure. Even more specifically preferred is a third timer- and/or counter-means starts from a begin-time (t5) of an IN-SYNC state after a first timer- and/or counter-means, in particular for stopping a first and/or second timer- and/or counter-means, in particular for indicating an end-of-jamming situation. The timers can be set freely according to the situation and adapted to the demands of the technical application.

Preferably existing synchronization primitives can be used and evaluated as described in TS 25.331 to derive the synchronization-indication, in particular in accordance to evaluation methods used for deriving a radio link failure criteria, in particular at least one counter or one or more of a N313-value and/or a T313-value and/or a T315-value.

Even more advantageous, as exemplified in the drawing at FIG. 8 to FIG. 10, the synchronization-indication is evaluated by means of at least one time measure in form of a counter of one or more of a N313-value and/or a T313-value and/or a T315-value as specified in 3GPP TS 25.331. This has the advantage that an existing time measure can used and needs not to be implemented for the new purpose. Preferably the use of a jamming warning is provided earliest with initiating of an OUT-OF-SYNC indication and/or latest before or with initiating an Out-of-Sync-Error. An Out-of-Sync error appears after a predefined number of OUT-OF-SYNC indications, in particular N313 OUT-OF-SYNC indications. Preferably a jamming detection is provided earliest with initiating an Out-of-Sync-Error and/or before or with a Radio Link Failure. Thus, preferably a jamming warning and a jamming detection can be provided in combination according to the stability of an OUT-OF-SYNC indication, whereby the initiating event gives an indication for a likelihood of a jamming situation, which can be reported to the UE or any other connected device.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does exclude a plurality.

In the drawing:

FIG. 1 shows a simplified symbolic graphic of a structure of a CDMA based radio network;

FIG. 2 is a graphic illustrating the correlation of a pseudonoise spread code SC with a communication signal unit SU to provide a pseudonoise chip CHI in a multiple shared communication frequency channel;

Figure 4:
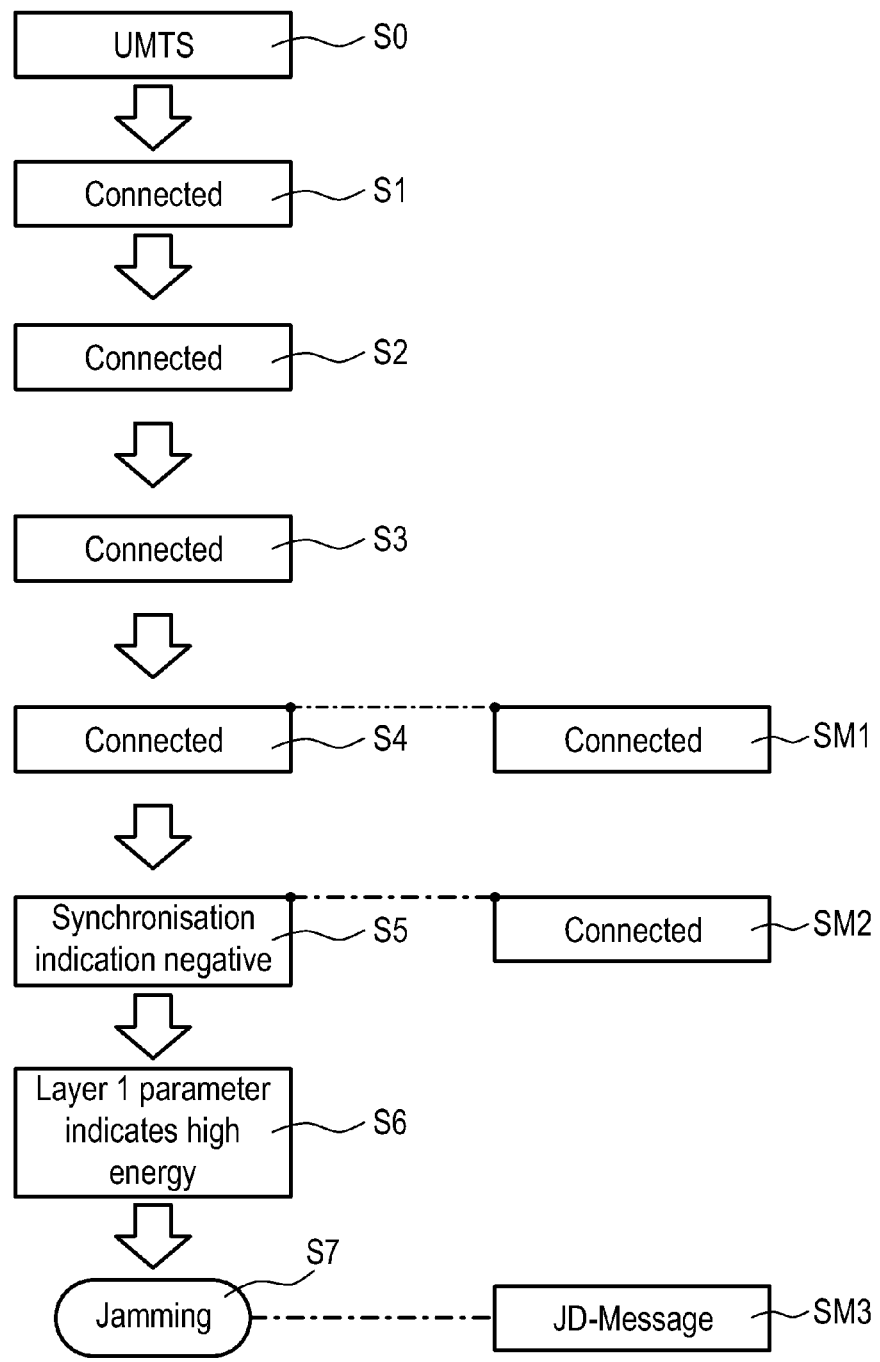
Figure 5:
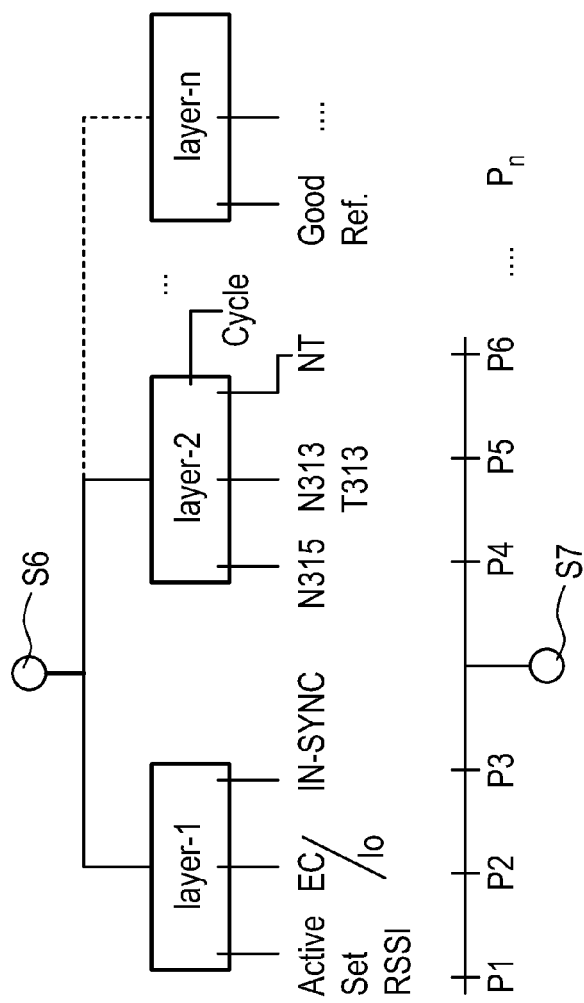
Figure 6:
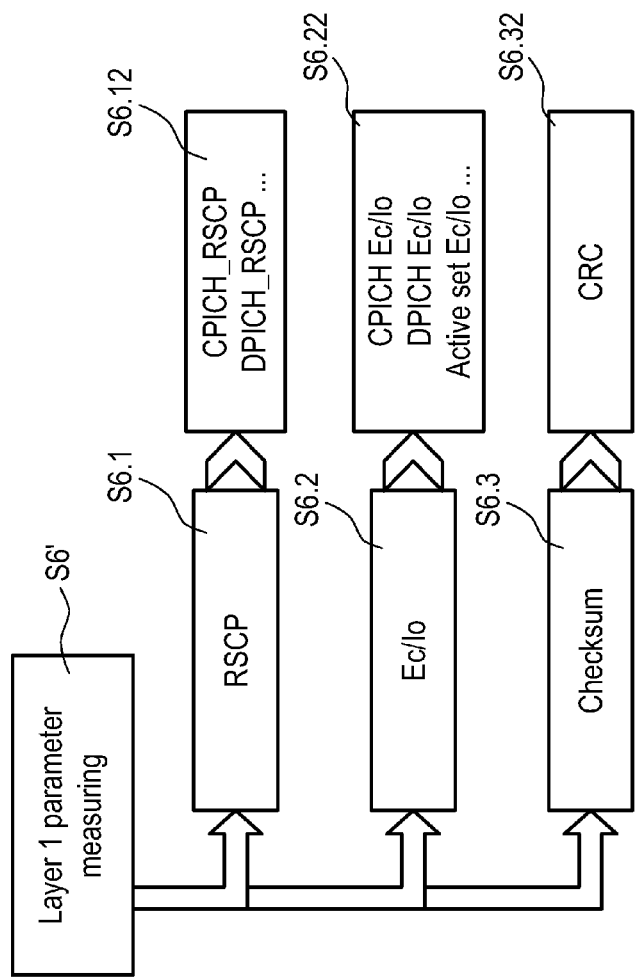
Figure 7:
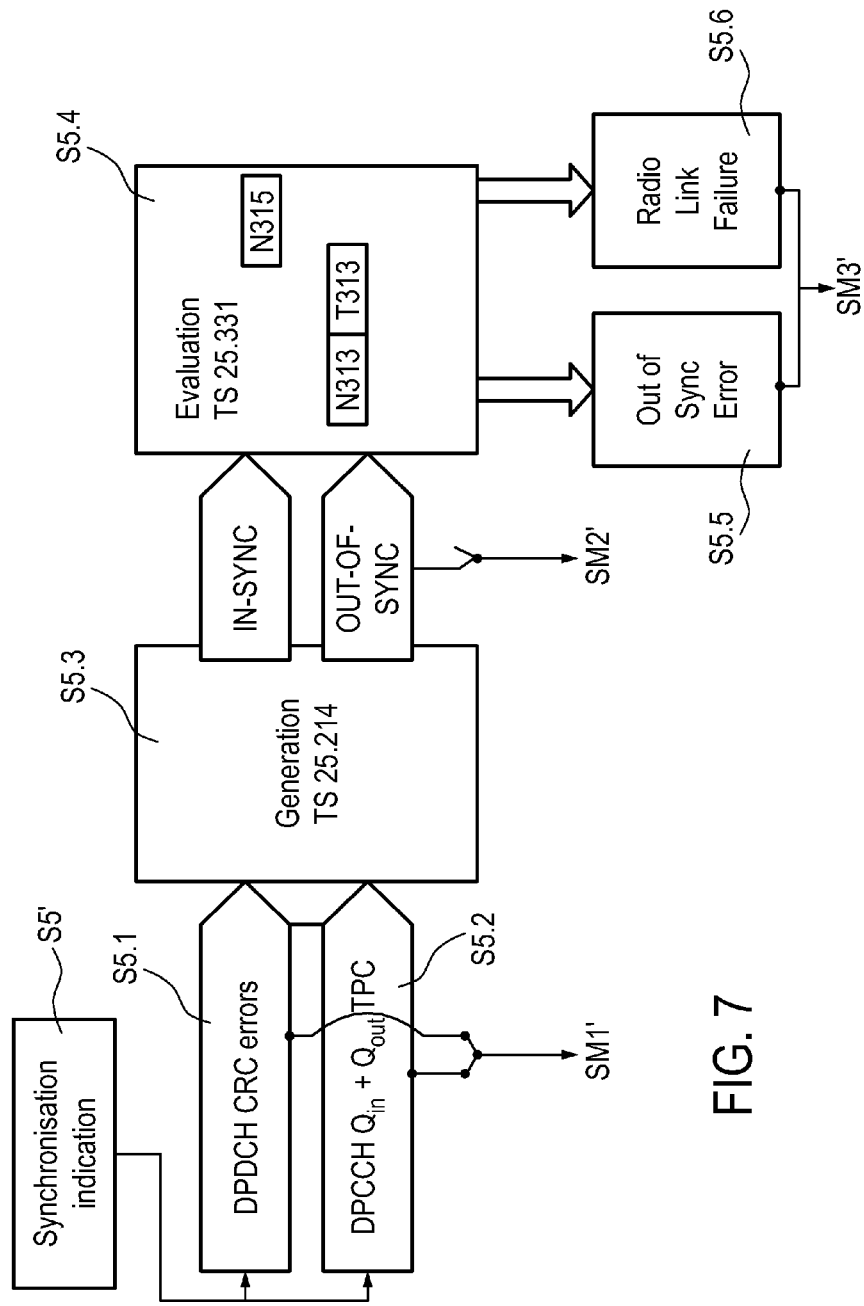
Figure 8:
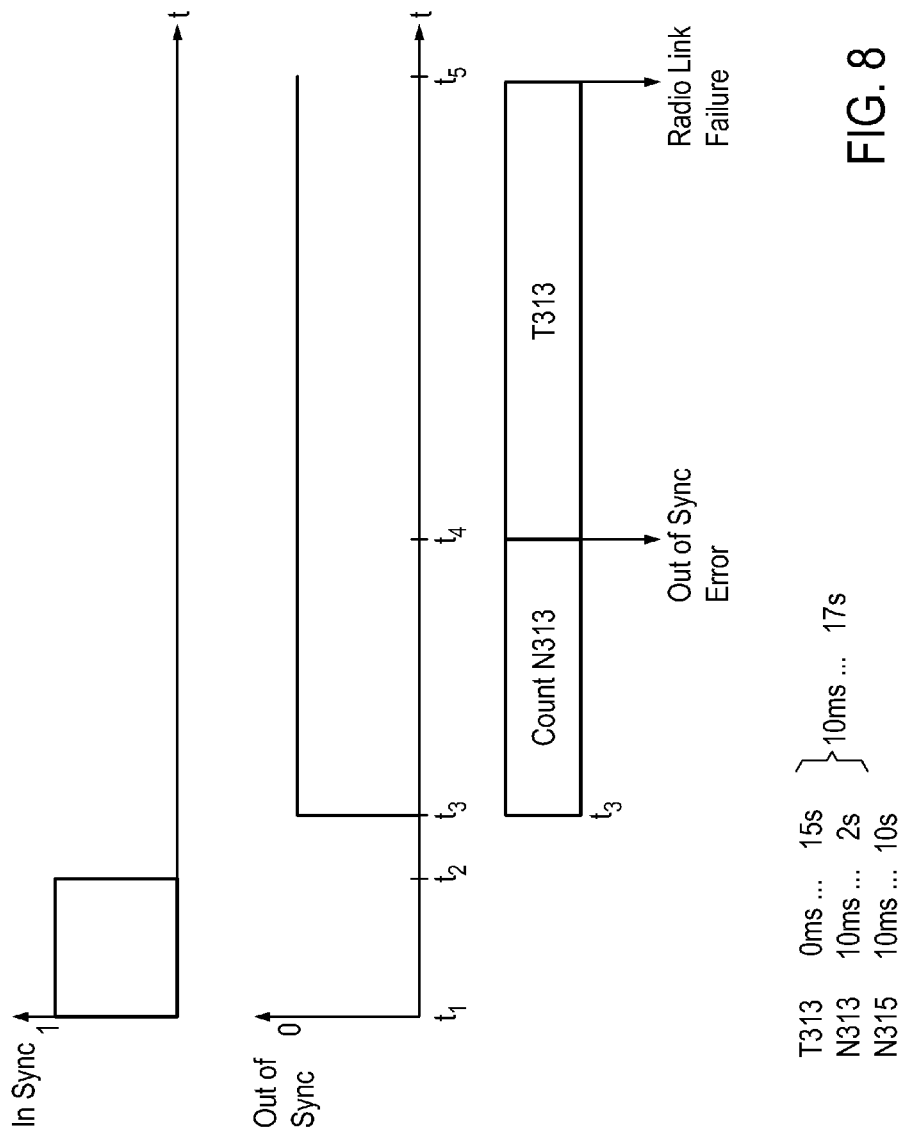
Figure 9:
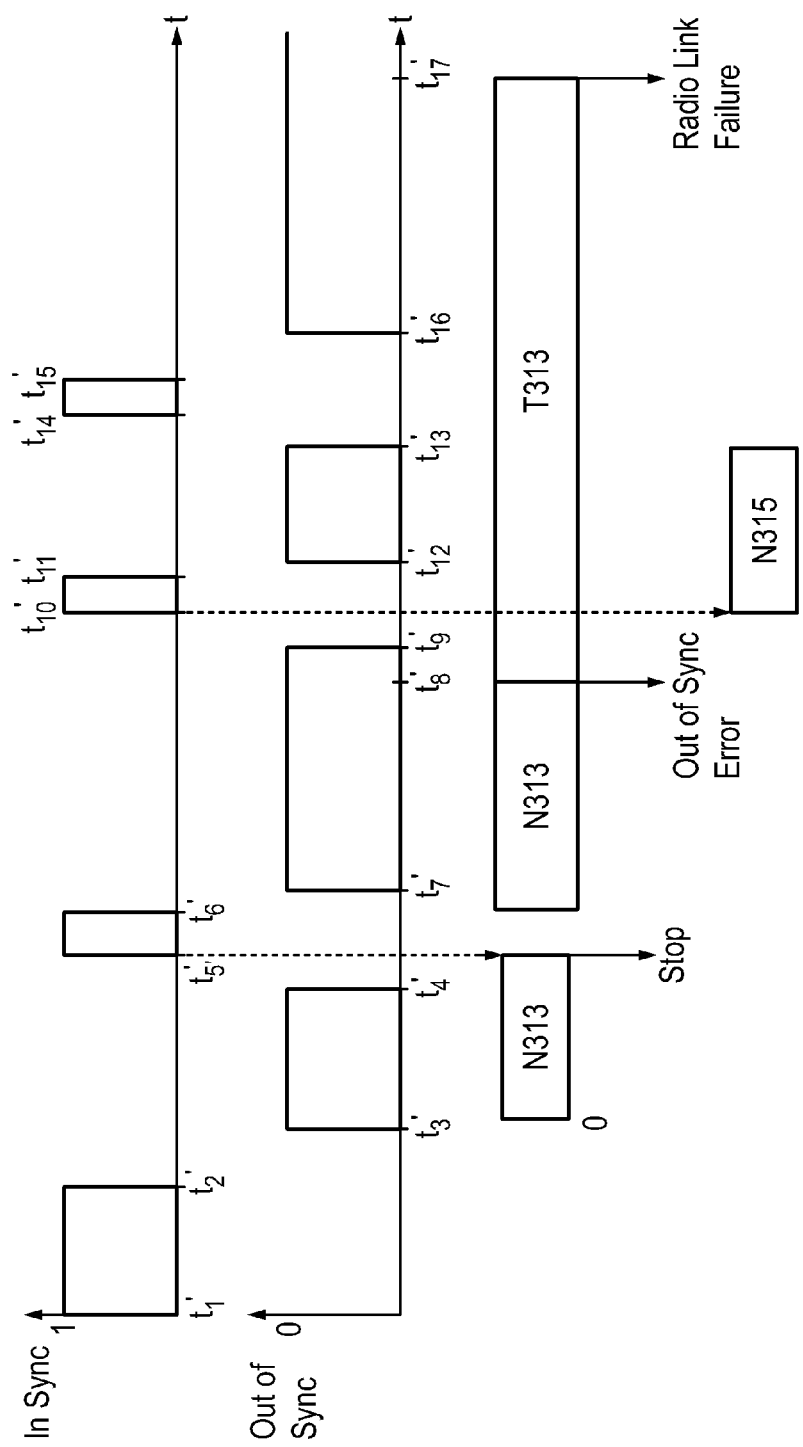
Figure 10:
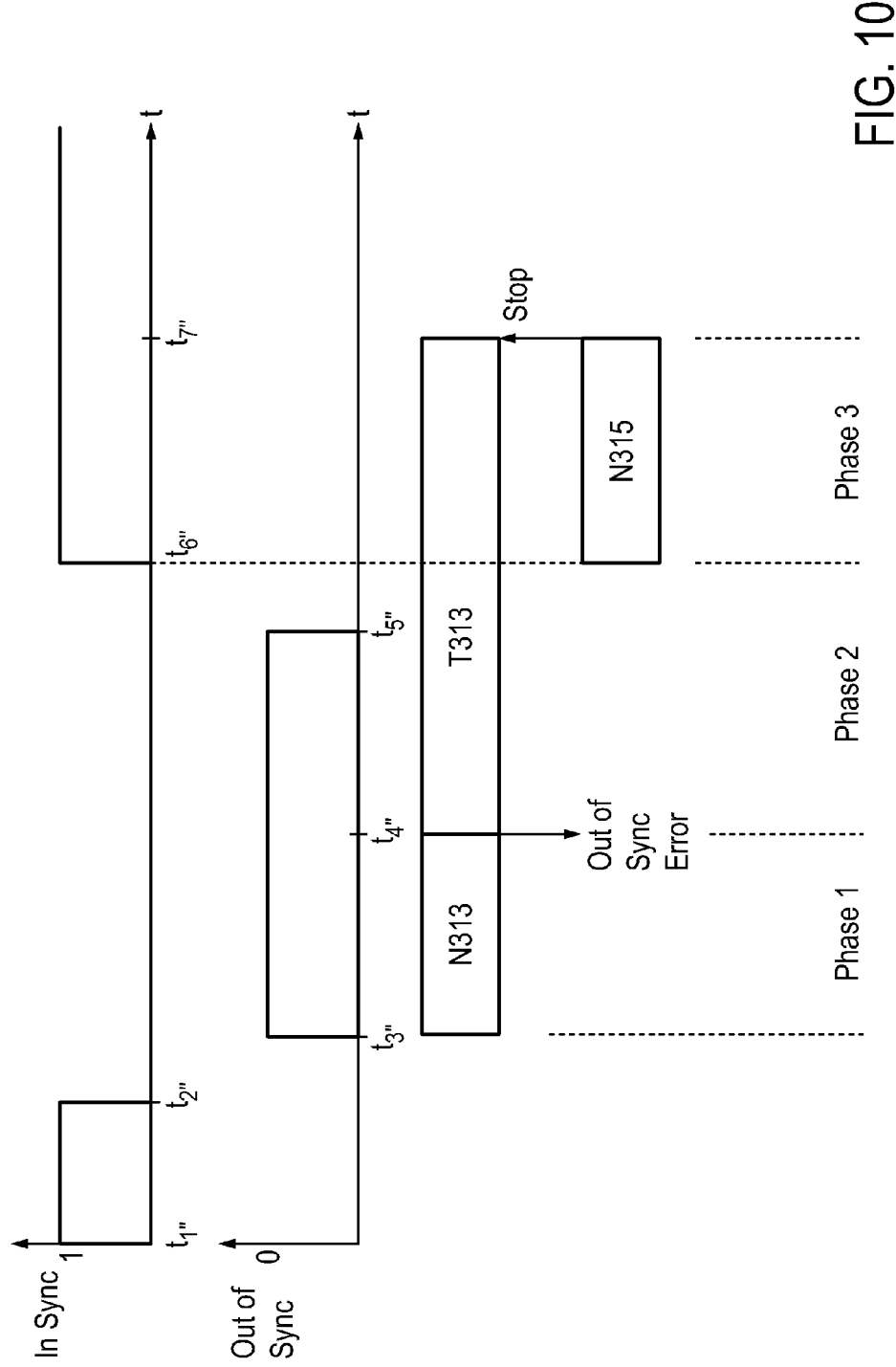

FIG. 3 a TPC error rate as a function of time with error thresholds indicative of an for IN-SYNC and OUT-OF-SYNC-status of a connection link in view of error the error rate relative to the error thresholds;

FIG. 4 a flow diagram illustrating the concept of the invention, wherein an IN-SYNC and OUT-OF-SYNC-status of a connection link can be accompanied by one or more parameters FIG. 5 a scheme for illustrating the concept of the invention wherein the parameters are selected from the group consisting of: error threshold indication, connection link energy and/or quality, time span of error rate duration, error rate fluctuation, mean value conditions, in particular wherein the status and/or parameters are provided periodically;

FIG. 6 a scheme for further specifying the FIG. 5 step S6 of a Layer-1 parameter for measuring of certain options of measurable parameters associated with the dedicated physical channel (DPCH);

FIG. 7 a flow scheme which can be used in the sequence of steps S3, S4 and S5 as generally described with FIG. 4;

FIG. 8 a first exemplifying embodiment of a counter sequence wherein upon an OUT-OF-SYNC-status a time span of error rate duration leads to a subsequent radio link failure immediately, which can be used for immediate jamming detection in a connected mode of a user equipment;

FIG. 9 a second exemplifying embodiment of a counter sequence wherein upon varying OUT-OF-SYNC- and IN-SYNC-stati a belated time span of error rate leads to a belated radio link failure, which can be used for an immediate jamming warning using error rate fluctuation and subsequent jamming detection using time span of error rate duration in a connected mode of a user equipment;

FIG. 10 a third exemplifying embodiment of a counter sequence upon varying OUT-OF-SYNC- and IN-SYNC-stati and finally remaining IN-SYNC-status leading to a stop of warning, which can be used for an immediate jamming warning and free-of-jamming indication in a connected mode of a user equipment.

FIG. 1 shows in principle a cellular code division multiple access CDMA based radio network RN. The radio network RN allows for several transmitters—here referred to as a user equipment UE—to send information simultaneously over a single communication channel. This allows several user equipments UE to share a bandwidth of different frequencies. The CDMA based network can employ a spread spectrum technology and a special coding scheme—for instance a frequency division duplex FDD or time division duplex TDD mode can allow multiple users to be multiplexed over the same physical channel. The spread spectrum signaling has a much higher data bandwidth than the data being communicated. The CDMA based radio network RN provides a set of at least one base node station—here for instance the serving base node station sBNS and the further base node station BNS, which are within reach of the user equipment UE. For instance a communication link 1 in a serving cell #1 coverage area CA1 of the sBNS #1 is provided between the communication user equipment #1 and the assigned serving base node station sBNS #1. As the user equipment UE #1 is also in the cell coverage area CA2 of the base node station BNS #2, the base node station BNS #2 and the serving base node station sBNS #1 form an active set of base node stations, which are both in reach of the user equipment UE #1. In the present embodiment the sBNS #1 has the strongest communication link 1.

The communication link 1 is adapted for transmitting a signal comprising multiple communication signal units SU between the communication user equipment UE #1 and the serving base node station sBNS #1. As exemplified in FIG. 2A the communication signal unit SU forms the input of a spreading code operation, wherein the signal unit SU is correlated with a pseudonoise spread code sSC in the serving cell coverage area CA1 of the serving base node station sBNS #1. The output signal of the spreading code operation is a so called pseudonoise chip CHI formed by the spreading encryption manipulating the original signal unit SU by means of the serving spreading code sSC. This can be performed either by an additive or multiplicative or other modified spreading operation as in principle known in the art.

As a result, the pseudonoise chip CHI is transmitted in a multiple shared communication frequency channel as indicated in the communication link 1 of FIG. 1 and can be transmitted or received by the user equipment UE #1 only when the serving pseudonoise spread code sSC is known by the user equipment UE #1. Once, the spreading code SC, i.e. the pseudonoise spread code is known, a signal unit can be received or transmitted by the user equipment UE #1.

The pseudonoise spread code SC is received by the communication user equipment UE #1 as a serving pseudonoise spread code sSC as shown in FIG. 1 in a so called serving downlink channel sCPICH. The CPICH contains 20 bits of data, which are either all zeros or in the case that space time transmit diversity is employed is a pattern of alternating ones and zeros for transmissions on the sBNS second antenna. The first antenna of a base node station always transmits all zeros for a CPICH. The CPICH downlink channel has a constant power and is of a known bit sequence. Its power is usually between 5% and 15% of the total BNS transmit power. A common CPICH power is of 10% of the typical total transmit power of 43 dBm. The CPICH can be used for measurements of signal quality.

As outlined in 3GPP ETSI TS25.214 during the cell search, a user equipment UE searches for a cell and determines the downlink spreading code and frame synchronization of that cell. The cell search is typically carried out in three steps:

Step 1: Slot synchronization
Step 2: Frame synchronization and code-group identification
Step 3: Spreading-code identification During the third and last step of the cell search procedure, the UE determines the exact primary spreading code used by the found cell. The primary spreading code is typically identified through symbol-by-symbol correlation over the CPICH with all codes within the code group identified in the second step. After the primary spreading code has been identified, the Primary CCPCH can be detected. And the system- and cell specific BCH information can be read. If the user equipment UE has received information about which spreading codes to search for, steps 2 and 3 above can be simplified. Once the spreading code for a CPICH is known, the channel can be used for measurements of signal quality, usually with RSCP and $E_c/I_0$ as will be shown below. Timing and phase estimations can also be made, providing a reference that helps to improve reliability when decoding other channels from the same Node B.

In the UMTS cellular communication system, received signal code power RSCP denotes the power measured by a receiver on a particular physical communication channel. It is used as an indication of signal strength, as a handover criterion, in downlink power control, and to calculate path loss. In CDMA systems, a physical channel corresponds to a particular spreading code, hence the same. While RSCP can be defined generally for any CDMA system, it is more specifically used in UMTS. Also, while RSCP can be measured in principle on the downlink as well as on the uplink, it is only defined for the downlink and thus presumed to be measured by the UE and reported to the Node B.

In the instant embodiment, a jammer affects the user equipment UE #1 by interfering with the multiple shared communication frequency channel as located in a communication frequency band. Frequency bands FBI to FBIXX are known, each having a bandwidth of approximately 60 MHz. Each frequency band comprises several communication frequency channels, each having a bandwidth of 5 MHz. For each frequency channel, therefore the noise floor of 110 dBm can be defined based on a relative noise of 174 dBm/Hz.

A staple power for an out of jamming region user equipment UE #10 is a piled up staple with a rather small amount of CPICH power, a larger amount of signal code power dedicated to the user equipment and a main portion of shared signal power. The latter is used by several user equipments in the same 5 MHz bandwidth of the communication frequency channel. Nevertheless, information can be retrieved for each user equipment according to the pseudonoise spread code provided by the serving base node station and also the further base node station to each of the user equipments.

Once the number of user equipments changes in a coverage area CA1 of the service base node station 1 the shared signal power may vary rather often. However, as the serving pseudonoise spread code SSC is available for the user equipment UE #10 even upon variation of the shared signal power, user equipment UE #10 can uphold the communication link to the serving base node station sBNS #1. The reason for this is that even upon variation of the shared signal power nevertheless the CPICH power can be detected by the user equipment UE #10. The CPICH power normally is located not more than 24 dBm below the upper level of the staple power. Thus, due to the spread code gain value of instantly 24 dBm CPICH power and pseudonoise spread code SC can be detected by the user equipment UE #10 during normal operation.

In the case the distance between serving base node station sBNS #1 and user equipment UE #10 is diminished like for instance the distance between sBNS #1 and UE10 the cell selection criteria power parameters Ec/Io ratio—in the standard denoted as CPICH Ec/Io as well as the received signal code power CPICH RSCP will increase—thus overall the signal quality will increase. However, in the case the distance between UE #10 and sBNS #1 is enlarged—for instance by moving to UE #20—the biased parameter Ec/Io, i.e. ratio CPIHC Ec/Io and the received signal code power CPICH RSCP of the sBNS #1 will decrease but instead of those of the BNS #2 will increase. Thus, upon a situation, the soft-handover may occur between sBNS #1 and BNS #2 by moving UE #10 to UE #20. This situation is described for instance in 3GPP TS25.133.

Distinct from those normal operation interferences in the communication frequency channels is the situation shown in FIG. 1 due to the presence of a jammer J.

The presence results in a user equipment UE #1 received staple power. Additional to the CPICH power the dedicated signal code and the shared signal power a large pile of jamming power on top of the staple power is detected by UE #1. The CPICH power therefore is not anymore in the spread code gain and consequently cannot be detected anymore. This situation is to be distinguished from the out of range situation as described in TS25.133 chapter 4.2.2.1. Namely, in the presently described situation of FIG. 1 the biased parameters are not detectable whereas the unbiased parameters have increased. The increase is due to the jamming power of jammer J. In the "out of service area" situation the unbiased parameters decrease as the biased parameters also decrease.

In principle this situation can be used to detect a jamming transmitter affecting the user equipment UE #1 when also an unbiased received wideband power within the bandwidth of the communication user equipment receiver at the communication user equipment UE #1 antenna connector is measured. Upon verifying the condition that the biased parameters—namely the Ec/Io and RSCP—are not detectable and the unbiased parameter RSSI has increased a first indication of a jamming transmitter is given.

However, this demands for comparison of power levels of different points of time; namely before and after the jamming situation. However, due to the timespan in between the different points of time the user equipment UE #1 may have fallen back into the idle mode and thus loosing the communication link cannot be prevented anymore. According to the concept of the invention this situation can be used already to provide an effective concept of detecting a jamming transmitter affecting the user equipment UE #1 without detecting and comparing power levels.

In particular according to the concept of the invention detection of a jamming situation is possible in a connected mode of the user equipment, said communication user equipment UE is adapted for communication with a component of a cellular code division multiple access CDMA based radio network RN having a number of user equipments UE and a number of base node stations BNS. As a preferred prerequisite it can be made sure, that the user equipment indeed is in a UMTS communication modus and the received signal strength is a signal of a CDMA based radio network. Here it is verified whether a respective UMTS communication indicator is set. E. g. a UMTS communication indicator can be on hold by means of a binary value stored or some setting of a user equipment which is indicative that the user equipment is capable and in reach of a UMTS communication signal. More importantly, as described in 3GPP TS 25.124 Chapter 4.3. in detail for the dedicated physical channels DCH, synchronization primitives are used to indicate the synchronization status of radio links, both in uplink and downlink.

In detail for downlink synchronization primitives the criteria for reporting synchronization status are defined in two different phases. Each phase is performed by the UE for each individual downlink frequency associated with the activated uplink frequencies. The downlink synchronization primitives are also reported to higher layers for each individual downlink frequency associated with the activated uplink frequencies. The first phase starts when higher layers initiate dedicated physical channel establishment or whenever the UE initiates one of a number of existing synchronization procedures as described in section 4.3.2.1 and 4.3.2.3A of 3GPP TS 25.124 and lasts until 160 ms after the downlink dedicated physical channel is considered established by higher layers (which is a physical channel establishment as defined in 3GPP TS 25.331: "RRC Protocol Specification"). During this time out-of-sync shall not be reported and in-sync shall be reported if a certain Transmit power control (TPC) criterion is fulfilled. The second phase starts 160 ms after the downlink dedicated physical channel is considered established by higher layers. During this phase both out-of-sync and in-sync are reported. Out-of-sync shall be reported if another certain Transmit power control (TPC) criterion is fulfilled. In-sync shall be reported if another certain Transmit power control (TPC) criterion is fulfilled. How the primitives are used by higher layers is described in 3GPP TS 25.331. The above definitions may lead to radio frames where neither the in-sync nor the out-of-sync primitives are reported.

In detail for uplink synchronization primitives Layer-1 in the Node B shall every radio frame check synchronization status of all radio link sets. Synchronization status is indicated to the RL Failure/Restored triggering function using either a certain IN-SYNC-indication primitive or a certain OUT-OF-SYNC-indication primitive. Hence, only one synchronization status indication shall be given per radio link set. The exact criteria for indicating in-sync/out-of-sync is not subject of the standard, but could e.g. be based on received DPCCH quality or CRC checks. One example would be to have the same criteria as for the downlink synchronization status primitives.

In particular, as will be described further, in a preferred embodiment a DPCCH or DPDCH can be used as part of a DPCH of a user equipment which exists for practical all operations, even when HSDPA/HSUPA operation is applied. A DPCH of a user equipment is needed as a reference in particular for a power control, preferably uplink and/or downlink power control. A Layer-1 information is given by a transmit power control TPC which can be used for addressing the state of the DPCH. In the case of jamming the transmit power control TPC is expected to be no more detectable and the user equipment stops transmitting as the transmit power control TPC, in particular the uplink (UL) transmit power control TPC is an important feature for the network. In this embodiment the power control is made on a received DPCCH whereas nevertheless any other DPCH could be used. But the DPCCH is part of the DPCH and is always existent even when HSDPA or HSUPA is made.

3GPP TS 25.101 explains in general certain Transmit power control (TPC) and tests in general and in Chapter 6 for a transmitter.

Thus, to the understanding here, generally power control, broadly speaking, is the intelligent selection of transmit power in a communication system to achieve good performance within the system. The notion of "good performance" can depend on context and may include optimizing metrics such as link data rate, network capacity, geographic coverage and range, and life of the network and network devices. Power control algorithms are used in many contexts including cellular networks. Transmit Power Control (TPC) is a technical mechanism used within some networking devices in order to prevent too much unwanted interference between different wireless networks (e.g. the owner's network and the neighbor's network). The network devices supporting this feature are e.g. IEEE 802.11h Wireless LAN devices in the 5 GHz band compliant to the IEEE 802.11a.

The idea of the mechanism is to automatically reduce the used transmission output power when other networks are within range. Reduced power means reduced interference problems and increased battery capacity. The power level of a single device can be reduced by 6 dB which should result in an accumulated power level reduction (the sum of radiated power of all devices currently transmitting) of at least 3 dB (which is half of the power).

The concept of the instant invention is based on detecting of an in-sync and/or out-of-sync behavior—the state, evolution and/or transient development—relative to the criteria of a threshold system; an example is given in FIG. 3. For FIG. 3 a communication system preferably is adapted such that therein said communication user equipment UE and a number of base node stations BNS are components of a cellular code division multiple access CDMA based radio network RN, in particular in a frequency division duplex FDD or time division duplex TDD mode, wherein a pseudonoise spread code SC is for spreading a communication signal unit SU and a synchronization of the user equipment UE to a cell of the cellular radio network RN is determined during connected mode of a communication radiolink via the dedicated physical channel DPCH adapted to indicate, in particular to an application layer, that a jamming transmitter is affecting the communication user equipment.

The embodiment of 3G in-call early jamming-detection is used to detect a jamming situation before a Radio link Failure is reported and before being out of service. The 3G in call early jamming detection is based on the Out-of-synchronization handling described in 3GPP TS 25.101. The UE shall monitor the DPCCH quality in order to detect a loss of the signal on Layer-1. The DPCCH quality is used in the UE for the purpose of monitoring synchronization.

The quality criterion is based in present example on measurement of the TPC command error ratio level, which is compared in the UE and to the thresholds Qout and Qin. These thresholds are used for decision if reliable detection of the TPC commands transmitted on the downlink DPCCH can be made.

The concept of the exemplifying approach as shown in FIG. 3 starts from the recognition that a state of the user equipment in an active DPCH connection as far as undisturbed can be used to monitor the state of being undisturbed or a state of being disturbed for instance by a jammer. This approach can extend to a transmission in a voice or other call connection and also data connection. Respective results as discussed below can be reported to an application layer for further handling for instance for further analysis and/or report of a jamming warning and/or jamming detection. The concept of the instant embodiment provides for generating a synchronization indication and evaluating the synchronization indication. In the instant embodiment the synchronization indication is generated from a power monitoring of a dedicated physical channel, namely here the DPCCH. The temporal evaluation of the power in terms of transmitted power can be reported by means of the TPC error which is put on the vertical access whereas the time is put on the horizontal access in FIG. 3. The TPC error rate is shown as a transient behavior, namely as a function TPCe(t). The transient behavior TPCe(t) is shown in view of a lower threshold TPCeL and a high threshold TPCeH.

Those values TPC1 below the low threshold TPCeL label a first time span t1, t2 and a second time span t5, t6 which are assigned to an in-synchronization state IN-SYNC. Those values TPC3 however which exceed the high threshold TPCeH label a time span t3, t4 which is assigned to an out of synchronization state out of sync. The reason is that the thresholds TPCeL and TPCeH can be such that according to experienced values error rates TPC1 on the one hand can be assigned to an IN-SYNC state and error rates TPC3 can be assigned to a OUT-OF-SYNC state respectively.

TPC error rates TPC2 in between the thresholds TPCeL and TPCeH are considered to be not clearly assignable to one or the other binary state of IN-SYNC state and OUT-OF-SYNC state; thus a gap between thresholds TPCeL and TPCeH increases reliability of this embodiment. However, in a more simplified embodiment also a single threshold TPCeM, e.g. somewhere in between TPCeL and TPCeH as an example, can be used to distinguish between TPC1 and TPC3 values.

As will be clear from the further description further parameters can be used to also clarify assignability of TPC error rate values to either TPC1 or TPC3 like values if considered as useful. Here not only the amplitude of a TPC error rate can be used as a single parameter for generating the synchronization indication but also further parameters like those shown in FIG. 4 can be used for reliably provide a indication of jamming, namely an indication of a detected jamming situation or indication of a jamming warning with a certain likelihood of being jammed.

In detail, FIG. 4 shows a flow diagram illustrating the concept of the invention for an UMTS based cellular radio network provided in step S0. In step S1 the user equipment UE is provided in a connected mode of a communication radio link, wherein a dedicated physical channel DPCH is used for the communication radio link. In step S2 a synchronization identification is generated from power monitoring of the dedicated physical channel DPCH and respectively TPC error values are measured and reported as a function of time, namely for instance in a periodical cycle of for instance 10 ms time scale for providing a error rate. In step S3 the synchronization indication in form of the TPC error rate is evaluated in view of amplitude thresholds for the TPC error rate. Thereby in step S4 the synchronization indication in the instant embodiment is transformed to a binary set of an IN-synchronization state and an OUT-OF-synchronization state plus an intermediate state. Thus in total in the instant embodiment the transient behavior of synchronization indication—here in form of the TPC error rate—is transformed to a trinary set of states. In step SM1, still in the connected mode, a warning of a jamming situation can be indicated independent of an evaluation of an out-of-synchronization state. In step S5 a, here e.g. negative, synchronization indication can be given in view of a lasting OUT-OF-synchronization state. Again, in step SM2, still in the connected mode, a further warning of a jamming situation can be indicated dependent of the negative synchronization indication, namely the OUT-OF-synchronization state. Also, this starts in step S6 determining a further parameter, namely here a Layer-1 parameter indicating a high energy in the transmission band, i.e. the respective dedicated physical channel, can be provided. In this situation the combination of an OUT-OF-synchronization state and high energy status of the respective dedicated physical channel can be taken as a reliable detection of jamming in step S7. Thus, the jamming situation in step S7 can be more reliable or more specifically detected or reported when taking into account the further parameter of step S6.

A number of further parameters are shown in a group of optional selection in FIG. 5. In a particular preferred embodiment that number of further parameters are merely selected from a Layer-1 of the network system. Thereby a prior layer-1 synchronization indication can be established. For instance, a link energy, for instance an active set RSSI value or a link quality, namely an active set RSSI value in combination with an EC/IO value can be used as further input parameters for jamming detection in step S6.

A method as exemplified in flow chart of FIG. 4 can be combined with further additions like good-reference-mean values, periodicity, timespan of duration and power and/or quality in the band as shown in FIG. 5. Some examples of a time span of duration criteria as based on using sync indicators N313 against N315 and timeout counter T313 are shown in FIG. 6 to FIG. 8. Thus also, in another embodiment, layer 2 parameters can be used to further input to the jamming detection, namely for instance a time measure for evaluating the temporal behavior of the synchronization indication. In particular here N313 value and/or a T313 value and/or T315 value can be used as counters as specified in 3GPPTS 25.331. Of course also a combination or some of the counters can be used in arbitrary choice. Also a specifically adapted counter can be used as a time measure which is different from the mentioned standardized counters. As will be clear from the further description the N313 and T313 values are triggered by an OUT-OF-SYNC state as evaluated form step S5 outlined in FIG. 4.

In an even further embodiment additionally a counter N315 can be used which is triggered by an IN-SYNC state as generated and evaluated in steps S4 of FIG. 4. Namely in the case an IN-SYNC state is evaluated N315 can be used to indicate a free of jamming situation once the time manager of counter N315 makes sure that no further inacceptable TPC error rate occurs. Thus, by using the number of parameters P1, P2, P3, P4, P5, P6 labeled for step S6 and S7 a large variant of reliable in-call jamming warnings and/or detections can be provided.

FIG. 6 shows certain variations of a Layer-1 parameter measuring indicated as S6' which can be used for performing step S6 of FIG. 4 as described above in a developed adaptation. Variants of Layer-1 parameters are depicted in FIG. 6 as for instance in S6.1 a value of a received code power RSCP, in S6.2 the value of ratio of the average transmit energy per pseudonoise chip for different fields of physical channels to the total transmit power spectral density which is depicted as Ec/Io—the latter value can also be formulated as a biased value of the ratio, namely the ratio of transmitted energy per pseudonoise chip of a dedicated physical channel DPCH to the total transmit power spectral density at the node B antenna connector. The ratio does not need to be measured alone; instead indeed an average energy per pseudonoise chip for instance for the dedicated physical channel or for different fields of physical channels can be detected first. Then a total transmit power spectral density at the node B antenna connector can be measured and then the ratio can be determined by a logic function or the like in a processor or a module.

Further, in S6.3 a value of a control value e.g. a checksum, hash value or the like for a field of physical channel usually can be defined as a control value which is transmitted in the dedicated physical channel; once the transmitted control value—namely the checksum—is correct this is an indication of a correct transmission. However, if the checksum or the like control value is not correctly transmitted and/or not correctly confirmed—e.g. by comparing the transmitted control value and the recalculated control value of the transmitted data—than this is a valuable confirmation that the transmission is somewhat erroneous.

More specifically the RSCP value in Step S6.1 indeed can be more specifically provided as a CPICH_RSCP or DPICH_RSCP as outlined in Step 6.12.

More specifically the Ec/Io value as depicted in step S6.2 can be more specifically be provided as a CPICH Ec/Io, DPICH Ec/Io or active set Ec/Io value as shown in step S6.22.

More specifically the checksum shown in Step S6.3 can be formed as a CRC (Cyclic Redundance Control) value as is shown in step S6.32.

Execution of step S6.1, S6.2 or S6.3 and/or S6.12, 6.22 or S6.32, respectively the values shown therein, can be measured or determined alone or in combination for forming a Layer-1 parameter indication. In the case one or more of the Layer-1 parameters specifically shown in FIG. 6 indicate a high energy/or negative checksum this will result in a positive outcome of step S6. In this case and in combination with a negative indication of synchronization of step S5 in FIG. 4 than in step S7 of FIG. 4 a jamming is safely to be detected.

FIG. 7 further shows for illustration of the steps S3, S4 S5—in particular for motivating the steps SM1 and SM2 here depicted as SM1' and SM2'—as a sequence of exemplifying steps in the flow chart which finally can result in the outcome of an OUT OF SYNC error or RADIO LINK failure depending on the situation. The general scheme of synchronization indication and generation thereof as exemplified in steps S3, S4 and S5 in FIG. 4 can also follow the scheme of FIG. 7. The scheme can be implemented on the whole or partly within step S5 or one of the preceding steps S3, S4. As shown in FIG. 7, starting with step S5', there are two options primarily to chose a dedicated physical data channel, namely the dedicated physical data channel DPDCH and the dedicated physical control channel DPCCH. In case of the DPDCH a suitable method of generating a sync status is counting CRC errors as depicted in step S5.1 and then following a generation scheme of the standard, namely following an existing synchronization primitive as described in technical specification 25.214 to derive a synchronization indication in step S5.3. Similarly on a DPCCH a $Q_{in}+Q_{out}$ TPC value of step S5.2 can also be used with regard to a standardized and existing synchronization primitive as described in technical specification 25.214 to derive a synchronization indication status. The status of synchronization can be an in-sync status IN-SYNC or an out-of-sync status OUT-OF-SYNC as depicted in FIG. 7.

Thus, somewhat the steps S5.1 and S5.2 correspond to the step S3 as depicted in FIG. 4. The step S5.3 somewhat corresponds to the step S4 depicted in FIG. 4. Consequently, a first warning SM 1' or a first indication of bad synchronization can be derived already from steps S5 and/or S5.2 depending on a certain behavior of CRC errors and/or TPC values.

Additionally or alternatively depending on a synchronization status derived from S5.3 in step SM2' a further more stringent jamming warning or a qualified indication of bad synchronization can be derived in the case the status is out-of-sync.

In particular, a jamming detection message corresponding to message SM3 shown in FIG. 4 can be given as jamming detection message SM3' subsequent to an out-of-sync error in step S5.5 or a radio link failure in step S5.6.

One or the other possibility of step S5.5 and step S5.6 can be derived from the evaluation thereof according to a standardized procedure shown in technical specification 25.331 and as depicted in step S5.4. Here, certain counters N313, T313 and N315 are provided for determining the time of an out-of-sync status and compare to a time of in-sync status. Depending on the outbalance of the competing counters either indication of an out-of-sync error or a radio link failure is possible. A detailed exemplifying description of the counters follows. Irrespective of these standard related counters, other counters can alternatively be implemented that lead to an earlier or later indication of an out of sync situation.

FIG. 8 to FIG. 10 depict three embodiments which illustrate scenarios of exemplifying sequences of IN-SYNC and OUT-OF-SYNC state. Each of the figures shows on the X-axis the time and the Y-axis the binary values "1" for an IN-SYNC state and 0 for an OUT-OF-SYNC state as for instance retrieved by the procedure depicted in FIG. 3 resp. S5.3 in FIG. 7. It should be clear that as indicated above also other indications of sync indications can be possible without departing from the spirit of the instant invention. The counters mentioned above, namely N313, T313 and N315 are each defined in TS25.331 which definition for this purpose is implemented by citation in this description. Generally, the principle of triggering the values of N313, T313 and N315 are as will be clear from the following procedural steps.

I. The layer-1 sync measurements are used to derive the Radio link failure criteria which is described in 25.331. In CELL_DCH State, after receiving N313 consecutive "out of sync" indications from layer-1 for the established DPCCH or F-DPCH physical channel in FDD the UE shall:
  start timer T313;
  upon receiving N315 successive "in sync" indications from layer-1 and upon change of UE state:
    stop and reset timer T313.
  if T313 expires:
    consider it as a "Radio link failure".

Periods in time where neither "in sync" nor "out of sync" is reported by Layer-1 do not affect the evaluation of the number of consecutive (resp. successive) "in sync" or "out of sync" indications.

II. The 3G in call early Jamming Detection is triggered by the handling of the "in sync" and "out of sync" indications from layer-1.

It uses two phases.

In the pre out-of-sync phase during accumulation of N313 out of sync indications a jamming detection is triggered by each out-of-sync.

In the out of sync phase jamming detection is triggered in each frame when T313 increments and in addition if N315 increments due to "in sync" indication.

With each trigger the power parameters like Ec/Io and RSCP of the active set are used for the jamming decision.

In addition the in-sync indications may be used to derive the reference values for the jamming decision.

FIG. 8 shows a situation wherein between points of time t1 and t2 an IN-SYNC state is indicated by the binary value "1". The situation changes between points of time t2 and t3. For times t after point of time t3 the binary value 0 is set for an OUT-OF-SYNC state. At the same time counter N313 starts to count upon persistence of the OUT-OF-SYNC state which is the case in FIG. 6 depending on the setting of counter N313 latest after two seconds (settings are configured by networks) at point of time t4 an OUT-OF-SYNC error is outputted to a higher layer or in particular application layer of the user equipment. Upon further persistence of the OUT-OF-SYNC state which is the case in FIG. 8 the counter T313 is started and depending on the setting of counter T313 latest after 15 seconds a radio link failure is outputted at point of time t5. The messages at point of times t4 and t5 for instance can be used to output a jamming warning and/or jamming detection message to the user by means of the application.

A more complicated situation is depicted in FIG. 9 which provides a more fluctuating onset of sync disturbance. Somewhat similar to the situation in FIG. 8 the IN-SYNC state lasts between point of time t1' and t2' and the OUT-OF-SYNC state starts at point of time t3' and counter N313 starts also at point of time t3'. However, at point of time t4' the OUT-OF-SYNC state again ends and at point of time t5' there is a further onset of an IN-SYNC state with binary value 1. Thus, at point of time t5' stop of counter N313 is triggered before expiration of counter N313 depending on the setting of counter N313 before a time span of two seconds at least. Thus, in this example of FIG. 9 no OUT-OF-SYNC error message is outputted. However, the IN-SYNC state with binary value "1" only lasts until point of time t6' and thereafter at point of time t7' again an OUT-OF-SYNC state is evaluated thus again counter N313 is started from the beginning and at this time a point persistence of the same situation until expiration of counter N313 an OUT-OF-SYNC error is outputted at point of time t8'. The situation for instance can be used for a jamming warning to the user. At same point of time t8' the counter T313 is started which however (unlike counter N313) is not stopped by the IN-SYNC states in between point of times t10', t11' and t14', t15' respectively. Instead each time, the previous OUT-OF-SYNC state ends at point of time t9' and is set on again at point of time t12' and respectively ends at point of time t13' and sets on again on point of time t16'. Thus, upon expiration of counter T313 at point of time t17' still an OUT-OF-SYNC state with binary value 0 persists. The reason is that the time span between points of time t10', t11' and respectively t14', t15' are somewhat below the setting of expiration time of counter N315; in other words the IN-SYNC state ends before expiration of counter N315 and thus is too short to make counter N315 stop counter T313.

The alternative situation is shown in FIG. 10 wherein again an IN-SYNC state lasts between point of time t1" to t2" and thereafter an OUT-OF-SYNC state starts at point of time t3" starting counter N313 and also persists at expiration of counter N313 at point of time t4". From begin of t3"—like in FIG. 3, FIG. 8 and FIG. 9 t3, t3 and t3'—or later, but latest at t4"—like in FIG. 3, FIG. 6 and FIG. 7 latest t4, t4 and t8'—a jamming warning can be outputted; thus during N313 which lasts for up to 2 s. According to FIG. 3—if can be reliably afforded a jamming warning can be outputted already at point of time t2; thus for TPC2 values.

Thus, in FIG. 10 at point of time t4" an OUT-OF-SYNC error is outputted and ends phase 1 (of jamming warning) like already described with FIG. 8. Start of phase 2—which can be used for jamming detection indication—starts with counter T313 at point of time t4". However, in difference to FIG. 8 and FIG. 9 at point of time t5" the OUT-OF-SYNC state ends and at point of time t6" a phase 3 is started with start of counter N315 in parallel to further expiring counter T313. Here and similarly in FIG. 9 it is recommended to persist with a jamming indication as long as phase 2 at least extends, even preferably as long as T313 is running. Thus a free-of-jamming indication could be but preferably is not given with the onset of an IN-SYNC indication in FIG. 9 and FIG. 10, but preferably only with run out of timer N315 stopping T313. At this example the IN-SYNC state following up point of time t6" persists until expiration of counter N315 beyond point of time t7". Here the counter N315 stops counter T313 and phase 3; which alternatively could also be used to replace a jamming detection indication with a jamming warning indication. Thereafter this situation can be used to provide a free-of-jamming message to the application.

These embodiments are further illustrated with regard to the following examples. Further, a measuring example 2 for a jamming situation is given and a measuring example 3 for a shielding situation is given respectively.

EXAMPLE 1

Basic Idea: Use-Cell DPCH "Out-of-Synch" Criteria

1.
CELL_DPCH state:
N313 consecutive "out of sync" indications from Layer-1=>Start T313
  a) N315 successive "in sync" indications from Layer-1=>Stop+reset T313
  b) T313 Expiry=>"Radio link failure"
=>Early Jamming detection can be triggered by the N313 and T313 counters.

The values of the sync timers and constants depend on the network.

These parameters are sent to the UE in the UTRAN MOBILITY INFORMATION message (25.331 chapter 8.3.3.3).

The values are transferred in the information element "UE Timers and Constants in connected mode" (25.331 chapter 10.3.3.43).

The ranges are:
T313: 0 . . . 15 seconds. Default value is 3.
N313: Integer 1, 2, 4, 10, 20, 50, 100, 200. Default value is 20.
N315: Integer 1, 2, 4, 10, 20, 50, 100, 200, 400, 600, 800, 1000. Default value is 1.

N313, T313 and N315 are part of the standard protocol stack.

The "in sync" and "out of sync" indications from L1 are evaluated each 10 ms frame for control of these timers and counters.

This is used to trigger collection of the Radio Link Quality data needed for early Jamming Detection. Therefore a set of Radio Link Quality data for early jamming detection is available every 10 ms.

2.
When radio link conditions are good N313 is 0 and T313 is not activated.

The Radio Link Quality data can be used as "Good Reference" by the JD.

When radio link conditions get worse e.g. due to Jamming during the phase preceding a Radio Link Failure, the counters/timers N313 and T313 start to count.

The set of data is used for Jamming Decision.

If a "Good Reference" is available, then the accuracy of the Jamming Decision increases. The decision "High Jamming Likelihood"/"Low Jamming Likelihood" can be made every 10 ms by evaluation of the data collected when N313 is incremented or T313 is active. The accuracy of the decision increases with each new set of jamming detection data.

3.
The principle is demonstrated below.
The example implementation uses a new 3G In Call jamming detection URC (lsta,12).
The URC displays the data used to trigger the JD.
Description of the 3G In Call jamming detection URC:
+CIEV: lsta,12,<parameters>
Parameters:

---

+CIEV: lsta,12,<phase>,<count>,<maxcount>,<rscp>,<io>,<ecio>
<phase>:    Phase / Type of the URC
              0="Good reference"
              1="N313 accumulation"
              2="T313 increment"
<count>:    Current value of N313+T313 (actual count of frames being out of sync)
<maxcount>:  Corresponds to maximum values N313+T313, depending on network settings
<rscp>:     Active Set RSCP presentation
<io>:       Noise derived from <rscp>and <ecio>
<ecio>:     Active Set ECIO presentation Note 1:
a set of jamming detection data is available every 10 ms; the data is filtered in the example to reduce the amount of data.
Note 2:
The first URC to be used for detecting the shielding or jamming situation is output 17 seconds before the call drops and "NO CARRIER" is indicated (value add of this invention report).

---

EXAMPLE 2

Example Jamming

```
// Precondition: Call is active, UE in state CELL_DCH
// Good Radio Link Conditions ("Good References")
[09:13:09:251]      +CIEV: lsta,12,0,0,520,-90,-81,-9.5
[09:13:19:251]      +CIEV: lsta,12,0,0,520,-92,-83,-9.5
[09:13:29:251]      +CIEV: lsta,12,0,0,520,-90,-82,-8.5
// Jammer is started (next URCs used for Jamming Decision)
[09:13:31:282]      +CIEV: lsta,12,1,1,520,-47,-23,-24.0
[09:13:31:470]      +CIEV: lsta,12,1,20,520,-47,-23,-24.0
[09:13:31:501]      +CIEV: lsta,12,2,21,520,-47,-23,-24.0
[09:13:31:970]      +CIEV: lsta,12,2,70,520,-47,-23,-24.0
[09:13:32:470]      +CIEV: lsta,12,2,120,520,-47,-23,-24.0
[09:13:32:970]      +CIEV: lsta,12,2,170,520,-47,-23,-24.0
[09:13:33:470]      +CIEV: lsta,12,2,220,520,-47,-23,-24.0
[09:13:33:970]      +CIEV: lsta,12,2,270,520,-46,-22,-24.0
[09:13:34:470]      +CIEV: lsta,12,2,320,520,-46,-22,-24.0
[09:13:34:970]      +CIEV: lsta,12,2,370,520,-47,-23,-24.0
[09:13:35:470]      +CIEV: lsta,12,2,420,520,-46,-22,-24.0
[09:13:35:970]      +CIEV: lsta,12,2,470,520,-46,-22,-24.0
[09:13:36:532]      +CIEV: lsta,12,2,520,520,-46,-22,-24.0
[09:13:36:532]      +CIEV: lsta,12,2,521,520,-46,-22,-24.0
// Radio Link Failure leads to call drop
[09:13:48:564]      NO CARRIER
[09:13:52:736]      +CREG: 2
```

EXAMPLE 3

Example Shielding (that is Connection Loss Due to Out of Service/Coverage Situation)

```
// Precondition: Call is active, UE in state CELL_DCH
// Good Radio Link Conditions ("Good References")
[09:15:20:206]   +CIEV: lsta,12,0,0,520,-90,-82,-8.5
[09:15:30:237]   +CIEV: lsta,12,0,0,520,-89,-83,-6.5
[09:15:40:237]   +CIEV: lsta,12,0,0,520,-92,-82,-10.5
// Shielding is started (next URCs used for Jamming Decision)
[09:15:42:456]   +CIEV: lsta,12,1,1,520,-126,-102,-24.0
[09:15:42:659]   +CIEV: lsta,12,1,20,520,-121,-97,-24.0
[09:15:42:659]   +CIEV: lsta,12,2,21,520,-126,-102,-24.0
[09:15:43:159]   +CIEV: lsta,12,2,70,520,-121,-97,-24.0
[09:15:43:659]   +CIEV: lsta,12,2,120,520,-125,-102,-23.5
[09:15:44:159]   +CIEV: lsta,12,2,170,520,-121,-97,-24.0
[09:15:44:659]   +CIEV: lsta,12,2,220,520,-124,-101,-23.5
[09:15:45:159]   +CIEV: lsta,12,2,270,520,-122,-101,-21.0
[09:15:45:659]   +CIEV: lsta,12,2,320,520,-125,-101,-24.0
[09:15:46:159]   +CIEV: lsta,12,2,370,520,-121,-97,-24.0
[09:15:46:659]   +CIEV: lsta,12,2,420,520,-125,-101,-24.0
[09:15:47:159]   +CIEV: lsta,12,2,470,520,-125,-101,-24.0
[09:15:47:706]   +CIEV: lsta,12,2,520,520,-121,-97,-24.0
[09:15:47:706]   +CIEV: lsta,12,2,521,520,-121,-97,-24.0
// Radio Link Failure leads to call drop
[09:15:59:722]   NO CARRIER
[09:16:04:066]   +CREG: 2
```

The invention claimed is:

1. Method of detecting a jamming transmitter affecting a user equipment, wherein
said user equipment is configured to communicate with at least one component of a cellular code division multiple access based radio network having a number of user equipments and a number of base node stations, wherein the cellular radio network provides a dedicated physical channel for a communication radiolink of the user equipment to a cell of the cellular radio network
providing the user equipment in a connected mode of the communication radiolink with the at least one component of the radio network and the user equipment is in a connected mode of the communication radiolink via the dedicated physical channel, wherein in the connected mode of said user equipment the steps are provided:
generating a synchronization-indication wherein the synchronization-indication is generated by monitoring signals of the dedicated physical channel,
evaluating the synchronization-indication,
measuring a further Layer-1 parameter associated with the dedicated physical channel, and
indicating a jamming transmitter in dependence of the evaluation and measuring.

2. Method according to claim 1 wherein the dedicated physical channel comprises at least one of a dedicated physical data channel and a dedicated physical communication channel.

3. Method according to claim 1, wherein the jamming situation is detected in dependence of a number of further parameters wherein the further parameters are selected from the group consisting of:
at least one link power signal,
at least one link quality signal, and
a checksum evaluation of one out of a group consisting of an in-synchronization state and an out-of-synchronization state.

4. Method according to claim 1, wherein the monitoring of the signal is performed by power monitoring and the synchronization-indication is generated by means of a transmission power control, as a rate of transmission power control errors.

5. Method according to claim 1, wherein the synchronization-indication comprises of evaluation of the dedicated physical channel, wherein an error evaluation of the dedicated physical data channel is performed and a quality-of the dedicated physical data channel is evaluated.

6. Method according to claim 1, wherein the synchronization-indication is generated in a cycle to provide a rate of synchronization-indication wherein the cycle has a periodicity.

7. Method according to claim 1, wherein the synchronization-indication is evaluated to a binary or trinary set of states, comprising an in-synchronization state and an out-of-synchronization state, and wherein an out-of-synchronization state is used as a parameter to detect a jamming situation and an in-synchronization state is used as a parameter to detect a free-of-jamming situation.

8. Method according to claim 1, wherein the synchronization-indication is evaluated by means of at least one time measure for evaluating the time behavior of the synchronization-indication, wherein the time span of an out-of-synchronization state is evaluated to detect a jamming situation or the time span of an in-synchronization state is evaluated to detect a free-of-jamming situation.

9. Method according to claim 1, wherein the synchronization-indication is further evaluated by means of at least one time measure and the time measure has at least one: start-trigger, stop-trigger, timer-means, and counter-means.

10. Method according to claim 1, wherein
a first timer or counter-means starts from a begin-time of an OUT-OF-SYNC state, for indicating an OUT-OF-SYNC error after expiration of said first timer or counter-means;
a second timer or counter-means starts from a time of an OUT-OF-SYNC state after a first timer or counter-means, for indicating a RADIO LINK failure; and
a third timer or counter-means starts from a begin-time of an IN-SYNC state after stopping a first and second timer or counter-means, for indicating an end-of-jamming situation.

11. Method according to claim 1, wherein the jamming situation is detected also in dependence of a number of further parameters wherein the further parameters are selected from the group consisting of: at least one radio link quality data, at least one timer or counter, and at least one synchronization-indication.

12. Method according to claim 1, wherein
a jamming warning is provided in the period between initiation of an OUT-OF-SYNC indication and initiation of an Out-of-Sync-Error.

13. Method according to claim 1, wherein a jamming detection is provided in the period between initiation of an Out-of-Sync-Error, and a RadioLink Failure.

14. Method according to claim 1, wherein a jamming probability is admitted depending on at least one of:
a trigger,
a predetermined combination of events, and
repeatedly occurring single events.

15. Device for a user equipment configured to detect a jamming transmitter affecting the user equipment in a connected mode within a cellular radio network that provides a dedicated physical channel for a communication radiolink of the user equipment to a cell of the cellular radio network, when the user equipment is connected in a connected mode of a communication radiolink via the dedicated physical channel, wherein the device has
- a generation unit configured to generate a synchronization-indication from a power monitoring of the dedicated physical channel comprising at least one of a signal and a power monitor detection unit for a dedicated physical channel,
- an evaluation unit configured to evaluate the synchronization-indication for evaluating an in-synchronization state and an out-of-synchronization state,
- a measuring unit configured to measure a further parameter at the dedicated physical channel, and
- a detection unit configured to detect a jamming situation in dependence of output of the evaluation unit and the measuring unit.

16. A system comprising:
- the device of claim 15, and
- a user equipment configured for communication with a component of a cellular code division multiple access based radio network having a number of user equipments and a number of base node stations,
- wherein the cellular radio network provides a dedicated physical channel for a communication radiolink of the user equipment to a cell of the cellular radio network and the user equipment is configured to be operated in a connected mode of a communication radiolink via the dedicated physical channel, and
- wherein the synchronization-indication is generated from power monitoring of the dedicated physical channel, and
- wherein the device is provided in a predetermined area or as part of the user equipment.

* * * * *